United States Patent [19]

Scott

[11] Patent Number: 5,443,139
[45] Date of Patent: Aug. 22, 1995

[54] BICYCLE CHAIN LUBRICATION

[76] Inventor: Fraser M. Scott, 106 Clober Rd., Milngaive, Glasgow, Scotland, G62 7SS

[21] Appl. No.: 966,080
[22] PCT Filed: Jul. 24, 1991
[86] PCT No.: PCT/GB91/01239
 § 371 Date: Mar. 24, 1993
 § 102(e) Date: Mar. 24, 1993
[87] PCT Pub. No.: WO92/01597
 PCT Pub. Date: Feb. 6, 1992

[30] Foreign Application Priority Data
 Jul. 24, 1990 [GB] United Kingdom ............... 9016198

[51] Int. Cl.⁶ ............................................. F16N 7/16
[52] U.S. Cl. .............................. 184/15.2; 184/15.1; 184/28; 280/261; 280/268.4; 474/91; 474/92; 198/495; 198/500
[58] Field of Search .................. 184/15.1, 15.2, 15.3, 184/28, 6.28, 6.4, 6.21, 6.23, 105.1, 108; 280/261, 288.4; 474/91, 92, 93; 30/123.4; 198/495, 500

[56] References Cited

U.S. PATENT DOCUMENTS

| 1,600,430 | 9/1926 | Schmidt | 184/28 |
| 4,632,080 | 12/1986 | Hurner | 184/6.4 |
| 4,881,928 | 11/1989 | Bernal | 474/91 |
| 4,911,339 | 3/1990 | Cushing | 280/288.4 |
| 5,158,218 | 10/1992 | Wery | 280/288.4 |

FOREIGN PATENT DOCUMENTS 2618948  11/1976  Germany ..................... 184/15.1

Primary Examiner—Edward K. Look
Assistant Examiner—Christopher Verdier
Attorney, Agent, or Firm—Ratner & Prestia

[57] ABSTRACT

An apparatus for cleaning and lubricating a bicycle chain while riding is provided. The apparatus includes a water reservoir, a lubricant reservoir and a device for transporting the lubricant and water to an injecting device for injecting said fluids onto the chain. Also provided is a device for enabling the water to be added to further cleansing agents in a dispenser before being gravitated to the injecting device. Similarly, a pump is provided for forcing a controlled quality of lubricant to the injecting device.

23 Claims, 5 Drawing Sheets

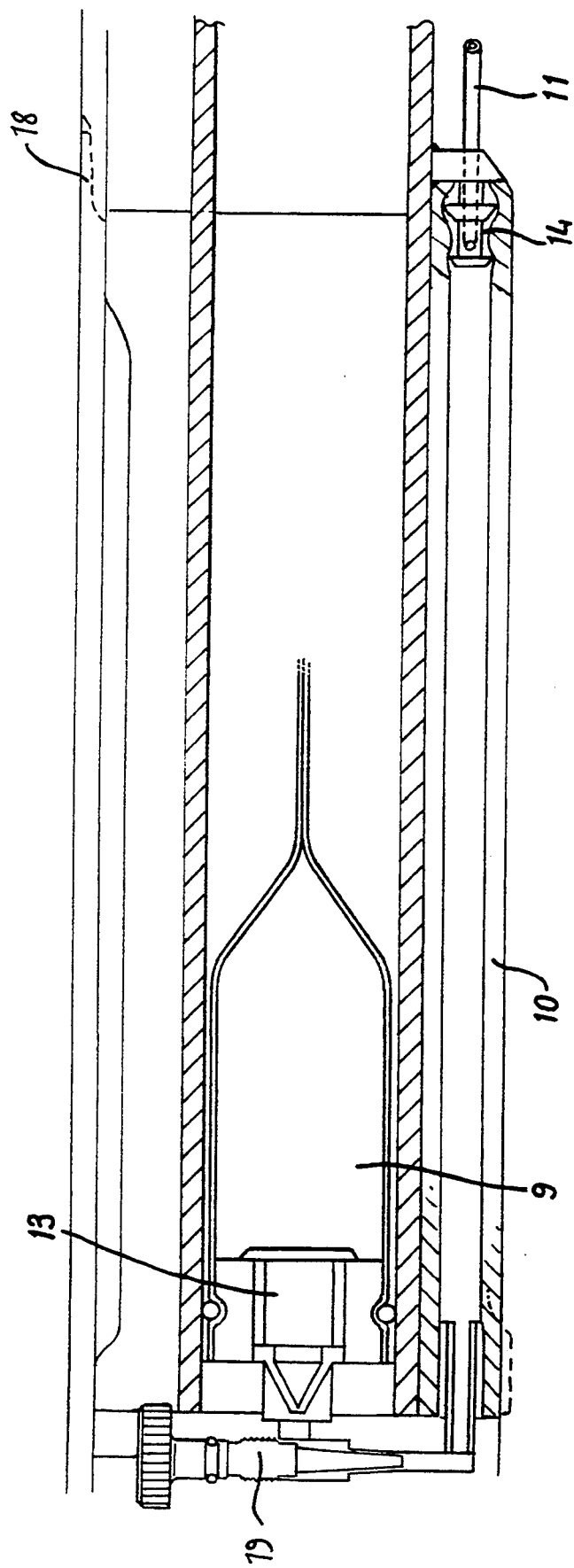

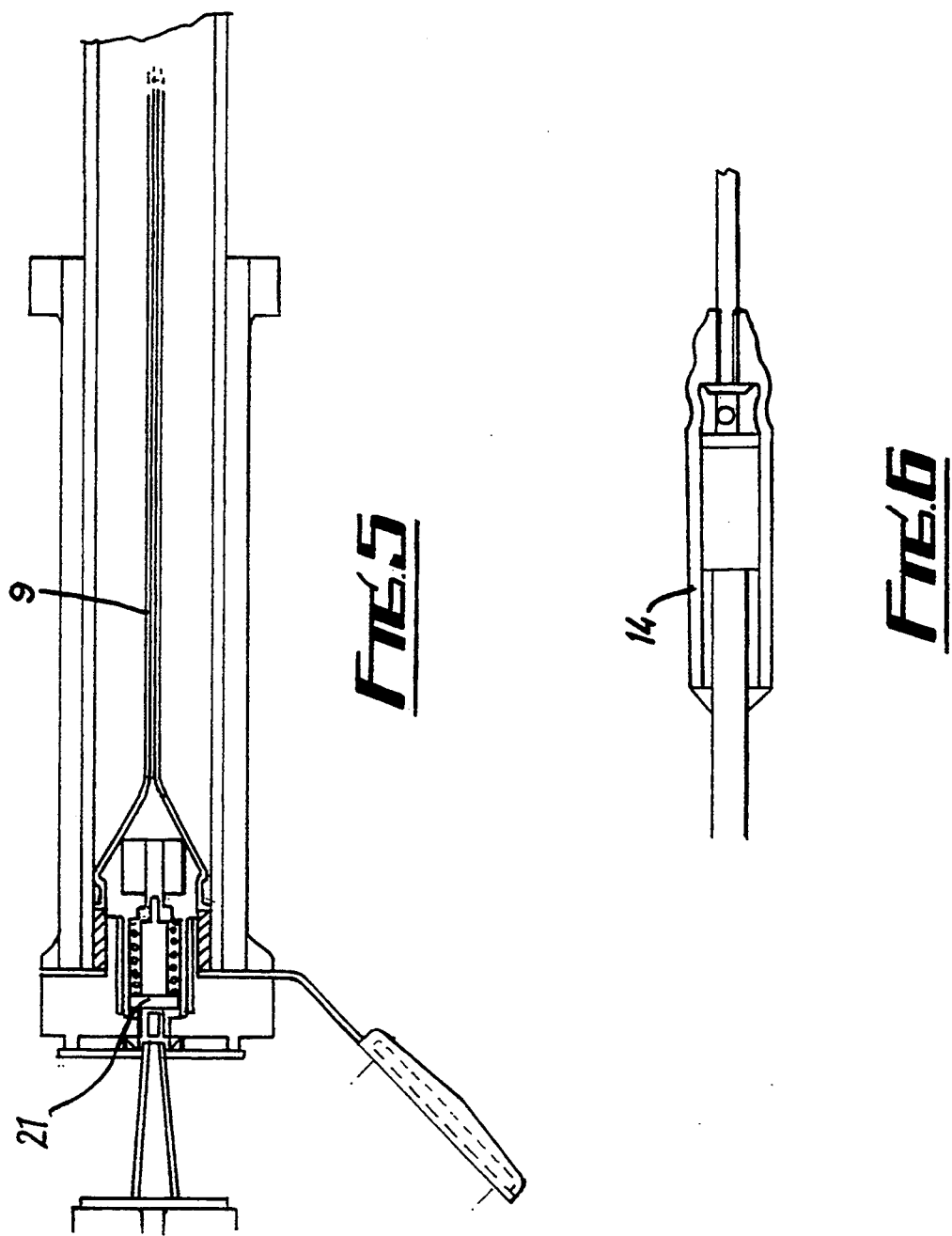

BICYCLE CHAIN LUBRICATION

This invention relates to the lubricating and cleaning of chains, such as are found on bicycles. The invention particularly relates to a means of enabling cleaning and lubrication of a gear chain while riding a bicycle.

SUMMARY OF THE INVENTION

In the past a coating of water-proof oil or grease has protected bicycle chains from wear and corrosion. However, road dirt tends to adhere to the oil and the combination of the dirt and oil forms a grinding paste which increases the friction of the chain and accelerates wear thereof. To prevent this from happening it is necessary to clean the chain often which, until now, requires the chain to be removed from the sprockets and immersed in a bath of oil-solvent. This is a tedious and filthy task, often leading to staining of the cleaner's hands and/or clothing.

This invention obviates, or at least mitigates, the above by enabling the chain on a bicycle to be cleaned and lubricated while riding.

According to the invention there is provided a means for cleaning and lubricating a chain comprising a lubricant reservoir, a pump and an injecting means, characterised in that it also comprises a water reservoir and water dispensing means wherein a cleansing fluid may flow from the water dispenser to the injecting means by a first connecting tube and said lubricant may be pumped from said lubricant reservoir to said injecting means through a second connecting tube, and wherein said injecting means is adapted to inject said cleansing fluid and said lubricant onto the chain.

Preferably, the water reservoir comprises a plastic drinking bottle.

Preferably, said water dispenser comprises a compartment having a large mouth for receiving water from said water supply.

Preferably, said water dispenser also includes a filter and a lid means for preventing dirt, dust or the like from entering therein.

Preferably, said water dispenser is adapted to contain a tablet of detergent, said tablet being water soluble.

Preferably, said injecting means comprises an injector plate which is mounted coaxially with and with minimal clearance to a lower derailleur guide wheel of a bicycle transmission, and wherein radial grooves are provided in the guide wheel so as to direct fluid dispensed into the injector towards the link pin bearings of the chain.

Preferably, the injector comprises a saucer shaped fixed cheek-plate, having one aperture means for receiving said connecting tubes.

Preferably, the lubricant reservoir comprises a re-fillable fluid container.

Preferably, the lubricant reservoir is transparent to enable the quantity of lubricant therein to be checked visually.

Preferably, the lubricant is a water soluble oil.

Preferably, the lubricant reservoir comprises venting means such that air pressure is used to resist spillage of the lubricant when a bicycle is inverted.

Alternatively, the lubricant reservoir has flexible walls which collapse as lubricant is pumped out of the lubricant reservoir.

Preferably, said pump comprises a self inflating bulb having a non-return inlet valve through which the lubricant is received from the reservoir and a pressure release outlet valve through which the lubricant is communicated to the injecting means.

Preferably, said outlet valve provides capillary means to lock the lubricant in said second connecting tube provided between the pump and the injecting means.

Preferably, said pump comprises a self inflating tube made from silicon.

Preferably, said pump also comprises a means of having variable control of the volume of lubricant pumped by a single pumping action of said pump.

Preferably, said control means includes a screw having a tapered end, wherein the position of said taper may be adjusted to restrict the flow between said lubricant reservoir and said pump.

Preferably, said control means may be used to prevent any flow of lubricant from said reservoir to said pump to prevent undesirable passage of lubricant.

Preferably, said pump is incorporated into a handle bar grip of a bicycle.

Preferably, said pump action of said lubricant is automatic as a rider of the bicycle varies his grip on the handle bars.

Alternatively, said pump is located in only a relatively small area of the handle bar grip so that a pumping action is performed only when positively intended.

Alternatively, the pump is integral with a bicycle frame or saddle.

Preferably, said lubricant reservoir is provided with a filling valve for filling said reservoir with said lubricant.

BRIEF DESCRIPTION OF THE DRAWINGS

An embodiment of the invention will now be described, by way of example only, with reference to the accompanying drawings, in which:

FIG. 4 is a plan view of an embodiment of the lubricant reservoir and pump,

FIG. 5 is a plan view showing part of a lubricant reservoir including the filling valve, FIG. 6 shows an embodiment of said outlet valve.

DESCRIPTION OF PREFERRED EMBODIMENTS

Figure 1:
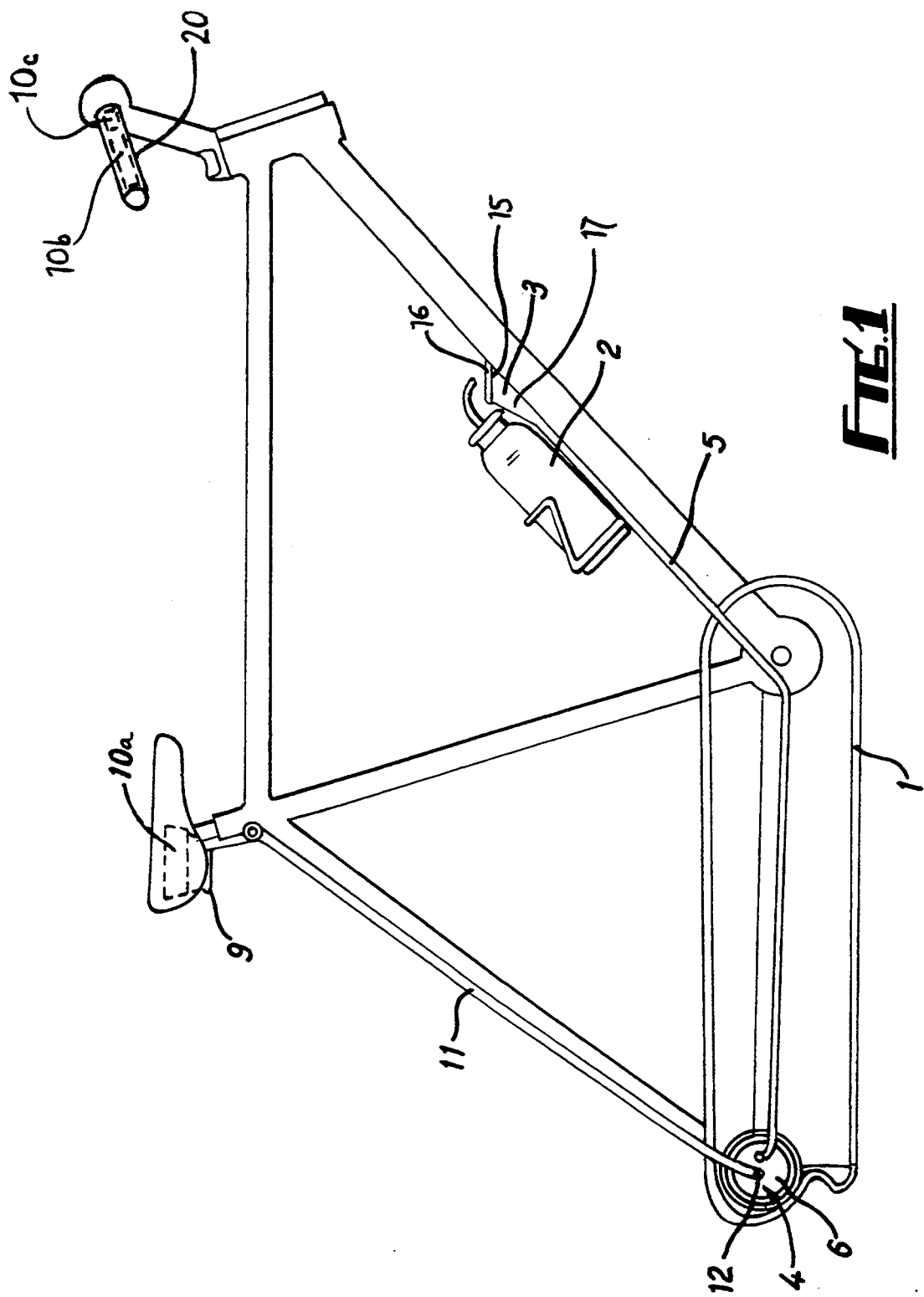
FIG. 1 is an elevation of the invention mounted on a bicycle.
Figure 2:
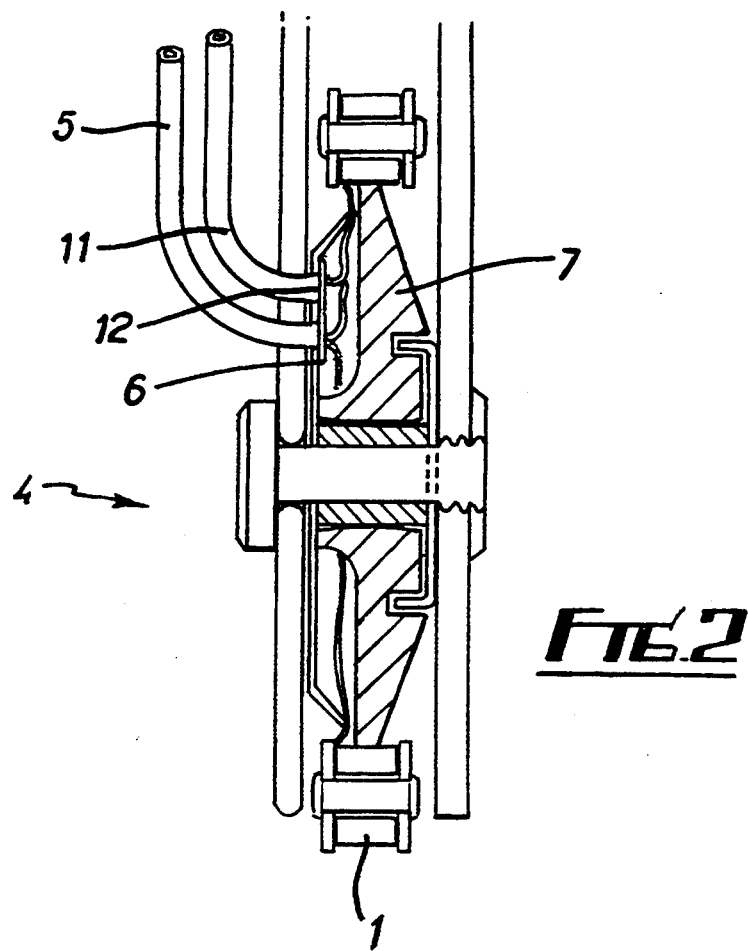
FIG. 2 is an end view of the injecting means.
Figure 3:
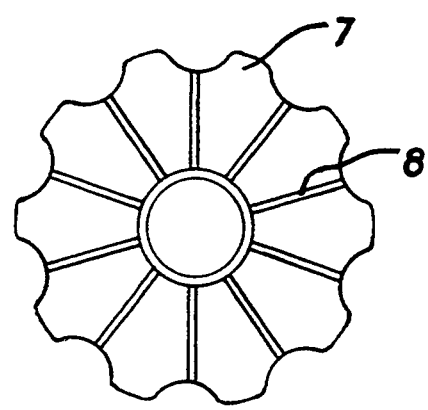
FIG. 3 is a side view of a guide wheel in accordance with the invention.
Figure 7:
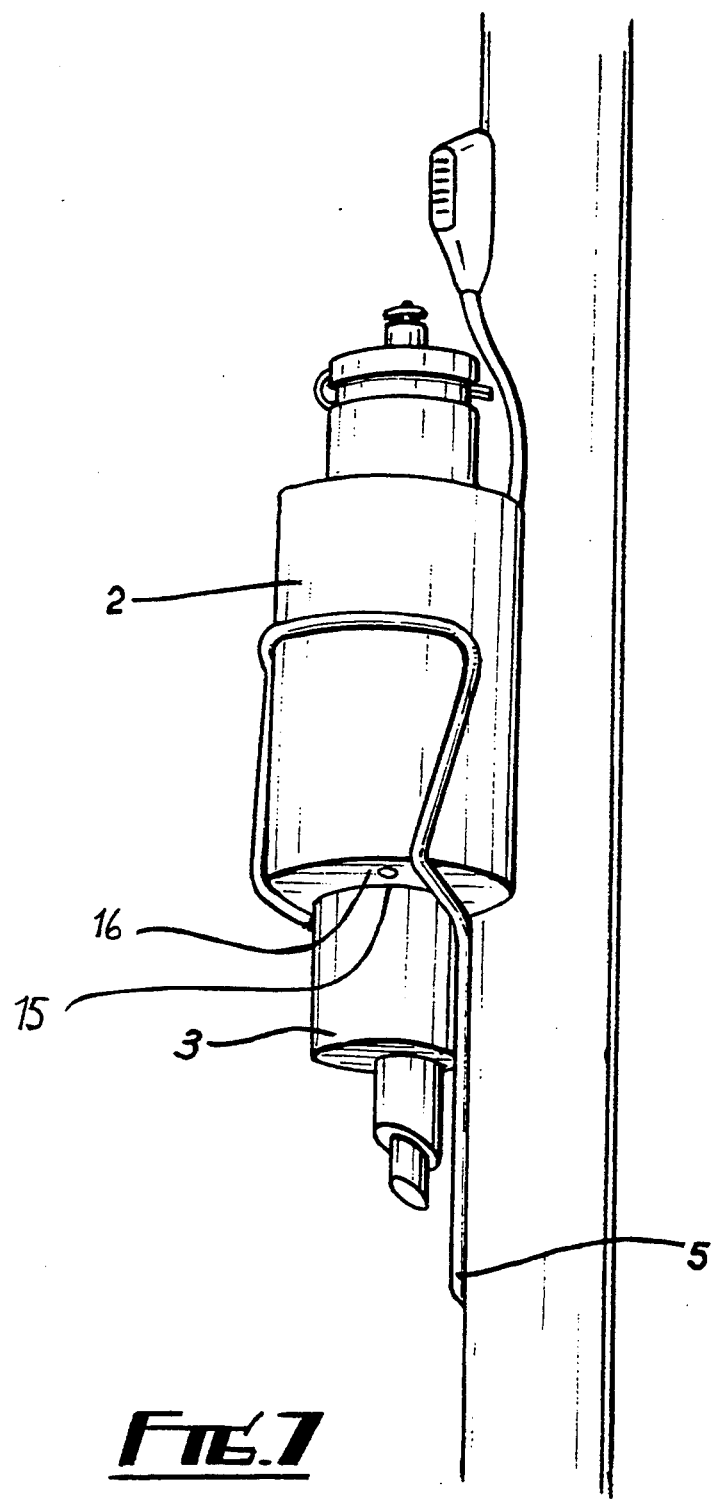
FIG. 7 is a pictorial view of a water reservoir and dispenser.

Referring firstly to FIG. 1, a means for cleaning and lubricating a sprocket chain 1 having link pin bearings comprises a water reservoir 2 and a water dispenser 3. The water reservoir 2 preferably comprises a drinking bottle such as is already commonly provided with bicycles.

The water dispenser 3 comprises an easily filled compartment which may be fixed to or integral with a bicycle. The dispenser 3, as shown in FIG. 1, includes a filter 15 and a lid 16 which together serve to forbid contamination of the water by dirt or dust or the like. The dispenser 3 preferably comprises a wide mouth with a tapered throat to enhance ease of filling and the prevention of air locks.

The water dispenser 3 communicates with an injecting means 4 by a first connecting tube 5. The injecting means 4 comprises a saucer shaped fixed cheek-plate 6 which is mounted coaxially with the lower derailleur guide wheel 7. The first connecting tube 5 is inserted through the plate 6 into a space which exists between the guide wheel 7 and the plate 6. This space is maintained at a minimal clearance, such as between one and three millimetres.

The lower derailleur guide wheel 7 is provided with a plurality of grooves 8 which extend radially from the centre of the wheel 7 towards the positions on the wheel 7 at which the link pin bearings of the chain 1 are located.

The water dispenser 3 is positioned above the injector plate 6 such that a pressure head is created which causes water or cleansing fluid in the dispenser 3 to pass through the connecting tube 5 into the injecting means 4. Detergent tablets or other cleansing additives may be added to the dispenser 3 to enhance the clearing properties of the fluid.

Means are also provided for injecting a lubricant onto the chain 1. Lubricant is stored in an oil or lubricant reservoir 9 which communicates with an on-line pump 10 via a second connecting tube 11. With the aid of the pump 10 the lubricant may be forced from the lubricant reservoir 9 to the injecting means 4, through the second connecting tube 11. The second connecting tube 11 is inserted through a respective aperture 12 in the injector plate 6, thereby enabling the lubricant to be injected onto the chain 1 by the same means as the cleansing fluid.

The pump 10, by way of example only, may include a self inflating bulb which when squeezed causes the pressure head of the lubricant to rise. A non-return inlet valve 13 is provided on the inlet side of the pump 10 and a pressure release outlet valve 14 is provided on the outlet side of the pump 10. When the pressure head of the lubricant is sufficiently raised, the lubricant travels through the connecting tube 11 into the injecting means 4. The outlet valve 14 also serves to capillary lock the lubricant in the connecting delivery tube 11.

The pump 10 may be located in any number of different positions on a bicycle, as also is true of the reservoirs 2, 9 and dispenser 3. They also may be added to or integral with the bicycle's frame. In a preferred embodiment the lubricant reservoir 9 and pump 10b, 10c are incorporated into the handle bar grip 20. Alternatively, the lubricant reservoir 9 and pump 10a may be provided in the saddle with the option of actuation by the rider's weight.

The lubricant is preferably water-soluble, having high film strength and rust-inhibiting properties.

At least two possible embodiments of the lubricant reservoir 9 are envisaged in the invention. Firstly, a closed re-fillable container may be used which, if not hidden internally in the frame, saddle or handle bars, should be transparent to enable a person to check the level of lubricant remaining. The container may have a breather or venting means 18 arranged to cause air pressure to resist spillage of the lubricant when the bicycle is upside down. Alternatively, the lubricant reservoir 9 may be provided with flexible walls which collapse as lubricant is pumped out of the reservoir 9. The lubricant reservoir 9 may have a filling valve 21 to assist its filling with lubricant.

In use, a person riding a bicycle comprising the invention pours or otherwise feeds water from the water reservoir 2, such as a drinking bottle, into the water dispenser 3. At this point the water may be added to other cleansing agents before being syphoned through the first connecting tube 5 into the space between the injector plate 6 and derailleur guide wheel 7. As the derailleur guide wheel 7 is rotated by pedalling, the resulting centrifugal forces causes the cleansing fluid to generate outward along the grooves 8 until it is deposited onto the link-pin bearings of the chain 1.

Once the user is satisfied that the chain 1 has been sufficiently cleaned, he/she may then proceed to lubricate the chain 1 by squeezing the pump 10 thereby causing lubricant to leave the lubricant reservoir 9 and flow through the second connecting tube 11 into the injecting means 4. The volume of lubricant displaced by one pump action is only the quantity of lubricant required to lubricate the chain 1 so as to reduce wastage and spillage and a tapered variable screw 19 may be provided to allow the flow between the lubricant reservoir 9 and the pump 10 to be regulated. Once the lubricant enters the injecting means 4 it is injected onto the chain 1 under the influence of the centrifugal force in a similar manner to the cleansing fluid.

It is envisaged in the invention that while there is minimal spillage or "fly-off" of cleansing or lubricating fluid, a deflector or guard may be provided to catch any spray of fluid given off by the rotating chain. Many bicycles are already provided with a chain guard and so this idea may be simply adapted.

The invention may also be adapted for use on bicycles having transmissions other than derailleur type transmissions. In this case, the injecting means would be adapted to ensure that the cleansing and lubricating fluids were still deposited on the chain, as required.

Modifications and improvements may be made without departing from the scope of this invention.

I claim:

1. A means for cleaning and lubricating a chain comprising a lubricant reservoir, a pump and an injecting means, characterised in that it also comprises a water reservoir and water dispensing means wherein a cleansing fluid may flow from the water dispensing means to the injecting means by a first connecting tube and lubricant may be pumped from said lubricant reservoir to said injecting means through a second connecting tube, and wherein said injecting means is adapted to inject said cleansing fluid and said lubricant onto the chain.

2. A means as claimed in claim 1, wherein the water reservoir comprises a plastic drinking bottle.

3. A means as claimed in claim 1, wherein said water dispensing means comprises a compartment having a mouth suitable for receiving water from a water supply from said water reservoir.

4. A means as claimed in claim 1, wherein said water dispensing means also includes a filter and a means for preventing dirt, dust or other foreign matter from entering therein.

5. A means as claimed in claim 1, wherein said water dispensing means is adapted to contain a tablet of detergent, said tablet being water soluble.

6. A means as claimed in claim 1, wherein said injecting means comprises an injector plate which is mounted coaxially with and with minimal clearance to a lower derailleur guide wheel of a bicycle transmission, and wherein radial grooves are provided in the guide wheel so as to direct fluid dispensed into the injector towards the chain and the link pin bearings thereof.

7. A means as claimed in claim 1, wherein the injecting means comprises a saucer shaped fixed cheek-plate, having one aperture means for receiving said connecting tubes.

8. A means as claimed in claim 1 wherein the lubricant reservoir comprises a re-fillable fluid container.

9. A means as claimed in claim 1 wherein the lubricant reservoir is transparent to enable the quantity of lubricant therein to be checked visually.

10. A means as claimed in claim 1 wherein the lubricant is a water-soluble oil.

11. A means as claimed in claim 1 wherein the lubricant reservoir comprises venting means such that air pressure is used to resist spillage of the lubricant when a bicycle is inverted.

12. A means as claimed in claim 1 wherein the lubricant reservoir has flexible walls which collapse as the lubricant is pumped out of the lubricant reservoir.

13. A means as claimed in claim 1 wherein said pump comprises a self inflating bulb having a non-return inlet valve through which the lubricant is received from the lubricant reservoir and a pressure release outlet valve through which the lubricant is communicated to the injecting means.

14. A means as claimed in claim 13, wherein said outlet valve provides capillary means to lock the lubricant in said second connecting tube provided between the pump and the injecting means.

15. A means as claimed in claim 1 wherein said pump comprises a self inflating tube made from silicon.

16. A means as claimed in claim 1 wherein said pump also comprises a variable control means for controlling the volume of lubricant pumped by a single pumping action of said pump.

17. A means as claimed in claim 16, wherein said control means includes a screw having a tapered end, wherein the position of said taper may be adjusted to restrict the flow between said lubricant reservoir and said pump.

18. A means as claimed in claim 16, wherein said control means may be used to prevent any undesirable flow of lubricant from said reservoir to said pump.

19. A means as claimed in claim 1 wherein said pump is incorporated into a handle bar grip of a bicycle.

20. A means as claimed in claim 19, wherein actuation of said pump is automatic as a rider of the bicycle varies his grip on the handle bars.

21. A means as claimed in claim 19 wherein said pump is located in only a relatively small area of the handle bar grip so that a pumping action is performed only when positively intended.

22. A means as claimed in claim 1 wherein the pump is integral with a bicycle frame or saddle.

23. A means as claimed in claim 1 wherein said lubricant reservoir is provided with a filling valve for filling said lubricant reservoir with said lubricant.

* * * * *